United States Patent
Zankowsky et al.

[11] 3,814,076
[45] June 4, 1974

[54] BARBECUE GRILL WITH GRILL HEIGHT ADJUSTMENT MEANS

[76] Inventors: Matthew S. Zankowsky, Box 535, Mountain Rd., Whitehouse, N.J. 08888; Robert A. La Patta, Rt. 22, R.D. No. 3, Somerville, N.J. 08846

[22] Filed: Mar. 15, 1973

[21] Appl. No.: 341,762

[52] U.S. Cl............................... 126/25 A, 85/1 L
[51] Int. Cl. ............................................ A47j 37/07
[58] Field of Search........ 85/1 L; 248/125; 211/176, 211/166; 108/144; 126/25 A, 25 AA, 9 R, 154

[56] References Cited
UNITED STATES PATENTS

| | | | |
|---|---|---|---|
| 1,308,325 | 7/1919 | Bird | 85/1 L |
| 1,327,934 | 1/1920 | Alcock | 85/1 L |
| 2,998,001 | 8/1961 | Lofgren et al. | 248/125 X |
| 3,176,676 | 4/1965 | Caldwell | 248/161 X |
| 3,487,743 | 1/1970 | Gutshall | 85/1 L |
| 3,511,222 | 5/1970 | Miller | 126/25 A X |

*Primary Examiner*—William F. O'Dea
*Assistant Examiner*—Harold Joyce
*Attorney, Agent, or Firm*—Clarence A. O'Brien; Harvey B. Jacobson

[57] ABSTRACT

An upstanding center support is provided in the central area of a barbecue fire pan and is of a constant horizontal cross-sectional shape throughout at least a predetermined portion of the height thereof. The cross-sectional shape of the standard or upright is such that it defines circumferentially spaced lobes or corner portions. The lobes or corner portions are formed with vertically spaced sets of horizontally registered outwardly opening notches and a grille member is provided with a central opening of a shape corresponding to the corss-sectional shape of the upright but slightly larger in transverse dimensions. When the grille member is rotated to a position with the lobes or corner portions of the opening registered with the corner portions or lobes of the upright the grille member is freely slidable along the upright. However, when the grille member is horizontally aligned with a selected set of notches and rotated relative to the upright to a position with the lobes or corner portions of the opening out of vertical registry with the lobes or corner portions of the upright the portions of the grille member defining those portions of the center opening intermediate adjacent lobes or corner portions are received in the notches formed in the lobes or corner portions of the upright so as to support the grille member from the upright against vertical shifting therealong and the grille member may therefore be readily adjusted in relation to the fire pan from which the upright is supported.

4 Claims, 4 Drawing Figures

PATENTED JUN 4 1974   3,814,076

BARBECUE GRILL WITH GRILL HEIGHT ADJUSTMENT MEANS

Barbecue grilles of the type including a fire pan and a center upright for supporting a grille in vertically spaced relation above the bottom of the fire pan are conventionally provided with means whereby the height of the grille relative to the fire pan may be adjusted. However, the means heretofore provided for supporting the grille for vertical adjustment relative to the fire pan are susceptible to malfunction due to the accumulation of dirt or the excess heat in the immediate vicinity during operation of the grille, at least after extended usage of the grille.

It is accordingly the main object of this invention to provide a barbecue grille including center standard or upright and cooperable grille structure whereby the grille structure may be supported from the upright in adjusted position therealong by means of structure which will be substantially unaffected by the accumulation of dirt, the formation of rust or excessive heat during operaton of the grille.

Another object of this invention is to provide a barbecue grille in accordance with the immediate preceding object and which will enable even the least expensive grilles to have the instant invention incorporated therein during manufacture.

Another object of this invention is to provide a barbecue grille with a grille member that may be readily adjusted in height as desired with a minimum of effort.

A final object of this invention to be specifically enumerated herein is to provide a barbecue grille in accordance with the preceding objects and which will conform to conventional forms of manufacture so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

Figure 1:
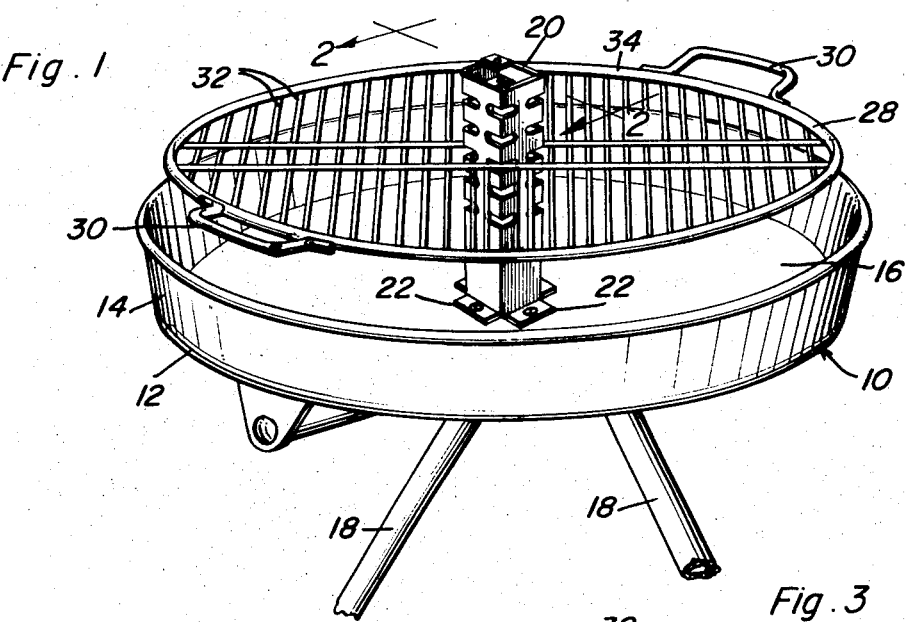
FIG. 1 is a fragmentary perspective view of a barbecue grille constructed in accordance with the present invention.
Figure 2:
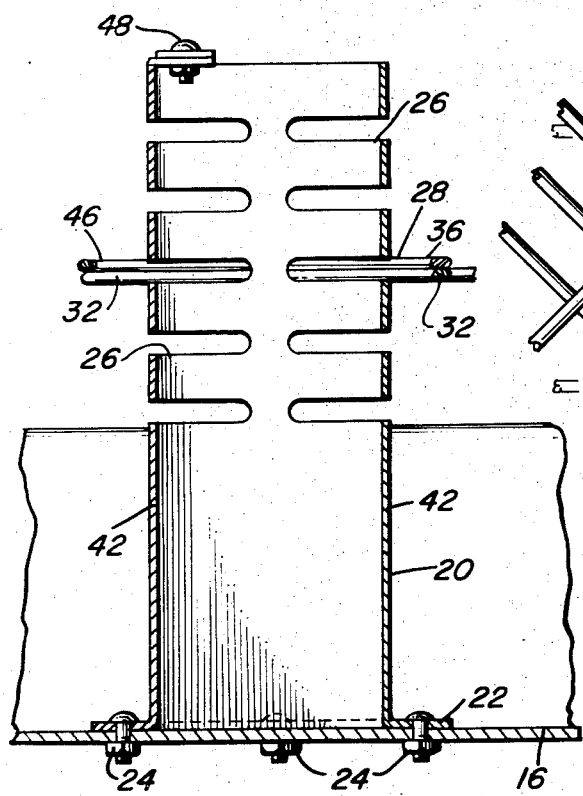
FIG. 2 is an enlarged fragmentary vertical sectional view taken substantially upon the plane indicated by the section line 2—2 of FIG. 1.
Figure 3:
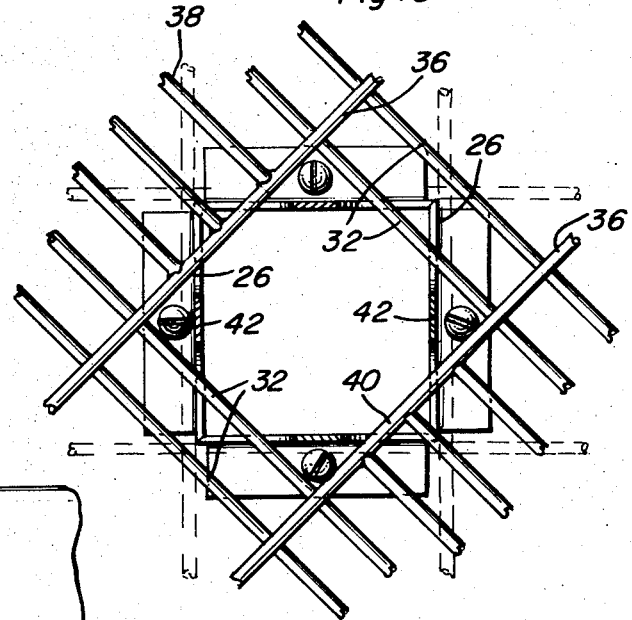
FIG. 3 is a fragmentary horizontal sectional view taken substantially upon a horizontal plane disposed immediately above the center of the grille member illustrated in FIG. 2.

Referring now more specifically to the drawings, the numeral 10 generally designates a barbecue grille including many conventional components. The grille 10 comprises an upwardly opening generally circular fire pan 12 including generally cylindrical upstanding side walls 14 and a bottom wall 16 from which depending downwardly divergent support legs 18 are carried.

An upright tubular standard 20 is provided and is substantially square in horizontal cross-sectional shape and includes lower end horizontally outwardly directed apertured mounting flanges 22 which are secured to the center portion of the bottom wall 16 by means of bolts 24 secured through the mounting flanges 22 and the bottom wall 16.

The four corner portions of the standard 20 have vertically spaced sets of horizontally registered outwardly opening notches 26 formed therein and a generally circular grille member 28 is provided and includes diametrically opposite handles 30.

The grille member 28 includes a plurality of transversely spaced parallel grille bars 32 secured across a circular support ring 34 from which the handles 30 are supported. In addition, the grille member includes a pair of parallel laterally spaced grille bars 36 spaced slightly on opposite sides of a diameter of the support ring 34 and to which the mid-portions of the grille bars 32 are secured. Still further, in addition to the grille bars 32 the grille member 28 includes three parallel center grille bars 38 whose mid-portions are omitted and whose inner ends are secured to corresponding sides of the mid-portions of the grille bars 36. The mid-portions of the innermost grille bars 32 and the mid-portions of the grille bars 36 define a central square opening 40 in the grille member 28 whose transverse dimensions are slightly greater than the outside corresponding dimensions of the standard or upright 20. Accordingly, when the grille member 28 is rotated about the standard 20 so that the square opening 40 is registered with the standard 20, the grille member 28 may be shifted up and down the standard 20. However, when the grille member 28 is registered with a predetermined set of the notches 26 and rotated approximately 45 degrees, the center portions of the innermost grille bars 32 and the center portions of the grille bars 40 swing into corresponding notches 26 whereby the grille member 28 is supported from the standard 20. The corner portions of the standard 20 may be considered as lobes receivable in the corner portions of the opening 40 when the grille member 28 is rotated to a position with the opening registered with the standard 20.

Figure 4:
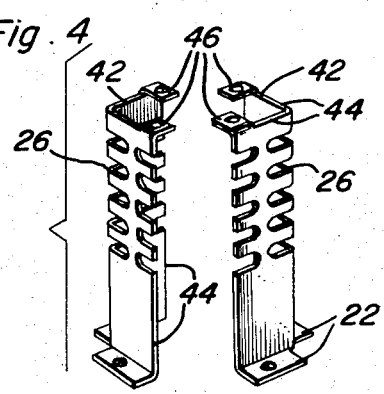
FIG. 4 is an exploded perspective view of the center upright of the instant invention.

From FIG. 4 of the drawings it may be seen that the standard 20 comprises a pair of upstanding sheet metal angle members 42 each including a pair of right angle flanges 44 from whose lower ends a pair of corresponding mounting flanges 22 are supported. Of course, opposite pairs of notches 26 are formed in the corner portions of the angle members 42 and other pairs of opposite notches 26 are defined in the free upstanding edge portions of corresponding flanges 44 of the angle member 42. Further, each angle member 42 includes a pair of apertured mounting flanges 46 which project inwardly from the upper free corners of the corresponding flanges 44 and the apertured flanges 46 of one angle member overlap the apertured mounting flanges of the other angle member and are secured thereto by means of fasteners 48.

Thus, it may be seen that the standard 20 may be readily mass produced at a low cost and quickly attached to the bottom wall 16 of the fire pan 12 by the purchaser so that the barbecue grille 10 may be readily shipped in a compact state with its legs removed. Further, the grille member may be readily produced without additional cost and thus a barbecue grille with a readily adjustable grille member is provided and may be readily assembled and conveniently used by the purchaser.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination, an upwardly opening fire pan including a bottom wall, a tubular standard of generally square cross sectional shape including a vertically extending portion thereof including vertically spaced sets of horizontally outwardly opening notches formed in all corner portions of said standard portion, and a horizontal grill member having a central square opening formed therethrough slidably disposed on said standard portion, said grill member including crossed pairs of parallel bars having central segments defining the peripheral edges of said square opening, said horizontal grill member, when angularly displaced about said standard, including central portions of said central segments defining said peripheral edges received in and supported from said notches against downward shifting relative to said standard, said notches opening into the interior of said standard portion, the opposite ends of each notch lying on a line extending diagonally across the corresponding corner portion, said lines of each set of notches defining a square whose side dimensions are slightly less than the corresponding dimensions of said opening, the lower end of said standard being supported from said bottom wall.

2. The combination of claim 1 wherein said standard is constructed of two half standard sections divided along a center vertical plane passing diagonally through said standard portion.

3. The combination of claim 2 wherein said half sections include lower end outwardly directed mounting flanges releasably secured to the center portion of the bottom wall of said fire pan.

4. The combination of claim 2 wherein said half standard sections are constructed of sheet material and include upper overlapped horizontal tabs secured together for securing said sections together.

* * * * *